(12) United States Patent
Gao

(10) Patent No.: US 11,703,690 B2
(45) Date of Patent: Jul. 18, 2023

(54) DISPLAY ASSEMBLY, DISPLAY DEVICE AND DISPLAY METHOD THEREOF

(71) Applicant: BOE Technology Group Co., Ltd., Beijing (CN)

(72) Inventor: Jian Gao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 17 days.

(21) Appl. No.: 17/343,284

(22) Filed: Jun. 9, 2021

(65) Prior Publication Data

US 2022/0221728 A1 Jul. 14, 2022

(30) Foreign Application Priority Data

Jan. 13, 2021 (CN) .......................... 202110042221.5

(51) Int. Cl.
*G02B 27/09* (2006.01)
*G02B 27/00* (2006.01)
*G02F 1/1335* (2006.01)

(52) U.S. Cl.
CPC ..... *G02B 27/0944* (2013.01); *G02B 27/0093* (2013.01); *G02B 27/0961* (2013.01); *G02F 1/133504* (2013.01)

(58) Field of Classification Search
CPC ............ G02B 27/0093; G02B 27/0944; G02B 30/27; G02B 5/189; G02B 5/1885; G02B 27/0961; G02B 30/26; G02B 30/34; G02F 1/294; G02F 1/133526; G02F 1/133504; H04N 13/00
See application file for complete search history.

(56) References Cited

U.S. PATENT DOCUMENTS

| 2014/0028933 A1* | 1/2014 | Chen ...................... G02B 30/26 359/465 |
| 2016/0011564 A1* | 1/2016 | Tanabe ................... G02B 26/06 359/11 |
| 2019/0196297 A1* | 6/2019 | Gao ....................... G02B 30/27 |

* cited by examiner

*Primary Examiner* — Mariam Qureshi
(74) *Attorney, Agent, or Firm* — IPro, PLLC

(57) ABSTRACT

A display assembly includes: a display module including a plurality of pixel islands; and a plurality of lens arrays laminated at a light-exiting side of the display module. Each lens array includes a substrate, a cover plate, a first transparent electrode, a second transparent electrode, and a liquid crystal layer and a diffraction lens grating arranged between the first and second transparent electrodes. The diffraction lens grating includes a plurality of diffraction lens grating units corresponding to the plurality of pixel islands. A voltage is applied to each of the first and the second transparent electrodes in such a manner that a refractive index of a liquid crystal molecule in the liquid crystal layer is equal to or not equal to a refractive index of the diffraction lens grating.

20 Claims, 10 Drawing Sheets

DISPLAY ASSEMBLY, DISPLAY DEVICE AND DISPLAY METHOD THEREOF

CROSS-REFERENCE TO RELATED APPLICATION

This application claims a priority of the Chinese patent application No. 202110042221.5 filed on Jan. 13, 2021, which is incorporated herein by reference in its entirety.

TECHNICAL FIELD

The present disclosure relates to the field of display technology, in particular to a display assembly, a display device and a display method thereof.

BACKGROUND

Along with the development of the display technology, a three-dimensional (3D) display technology has been widely used. Through a glassless 3D display technology, as a main display mode in future, it is unnecessary for a user to wear any auxiliary device.

However, for a conventional 3D display device, there is a conflict between convergence and focal length. A user's pupil is fully covered by an individual viewpoint, and a monocular focus depth and a binocular convergence depth are not in a same plane which is different from a visual habit when a real world is viewed by the user. Hence, visual fatigue is caused in the case of long-term viewing, and thereby a sense of vertigo occurs. To solve this problem, a multi-viewpoint glass 3D technology has been proposed. In this technology, multi-viewpoint images are generated through a prism, and optical field display consisting of more than two viewpoints is formed for the user's pupil, so as to prevent the conflict between convergence and the focal length. However, there is such a problem that, in order to meet the requirement of viewing through two eyes, more than two viewpoints need to be formed in the pupil but the two eyes are required not to view a same pixel, so a 3D display device is provided with a very small viewing space.

SUMMARY

In one aspect, the present disclosure provides in some embodiments a display assembly, including: a display module including a plurality of pixel islands arranged in an array form; and a plurality of lens arrays laminated one on another at a light-exiting side of the display module. Each lens array of the plurality of lens arrays includes a substrate, a cover plate arranged opposite to the substrate, a first transparent electrode arranged at a side of the substrate facing the cover plate, a second transparent electrode arranged at a side of the cover plate facing the substrate, and a liquid crystal layer and a diffraction lens grating arranged between the first transparent electrode and the second transparent electrode. The diffraction lens grating includes a plurality of diffraction lens grating units corresponding to the plurality of pixel islands respectively. A voltage is applied to each of the first transparent electrode and the second transparent electrode in such a manner that a refractive index of a liquid crystal molecule in the liquid crystal layer is equal to or not equal to a refractive index of the diffraction lens grating.

In some possible embodiments of the present disclosure, the diffraction lens grating includes a first diffraction lens grating arranged at a side of the cover plate facing the substrate and/or a second diffraction lens grating arranged at a side of the substrate facing the cover plate. 100071 In some possible embodiments of the present disclosure, when the quantity of lens arrays laminated one on another is greater than 2, in two adjacent pairs of lens arrays, the substrate of a lens array away from the display module in one pair of lens arrays serves as the cover plate of a lens array adjacent to the display module in the other pair of lens arrays.

In some possible embodiments of the present disclosure, the display assembly further includes a polarizer arranged between the display module and the lens array.

In some possible embodiments of the present disclosure, the display module is a Liquid Crystal Display (LCD) module or an Organic Light-Emitting Diode (OLED) display module.

In some possible embodiments of the present disclosure, the display assembly further includes a transparent spacer layer arranged between the display module and the lens array.

In some possible embodiments of the present disclosure, a long-axis direction of the liquid crystal molecule in the liquid crystal layer is substantially parallel to an optical axis of the polarizer.

In some possible embodiments of the present disclosure, a distance between each lens array and the display module and a width of each diffraction lens grating unit are determined in accordance with a viewing space of designed multi-viewpoint optical field display and a resolution of the multi-viewpoint optical field display.

In some possible embodiments of the present disclosure, a length of each pixel in the pixel island is approximately one third of the width of the diffraction lens grating unit.

In some possible embodiments of the present disclosure, the diffraction lens grating unit is an N-step phase diffraction lens grating unit, where N is $2^n$, and n is a positive integer.

In some possible embodiments of the present disclosure, the width of the diffraction lens grating unit is designed in accordance with a length of a subpixel.

In some possible embodiments of the present disclosure, the width of the diffraction lens grating unit is approximately three times of the length of each subpixel in the plurality of pixel islands.

In some possible embodiments of the present disclosure, the diffraction lens grating unit is an 8-step phase diffraction lens grating unit.

In some possible embodiments of the present disclosure, a phase difference between adjacent steps of the 8-step phase diffraction lens grating unit is $2\pi/N$, and a height h of each step is calculated through $$h = \frac{\lambda/N}{n_e - n_o},$$

where $\lambda$ represents a wavelength of incident light, $n_e$ represents a refractive index of a grating material, and $n_o$ represents a refractive index of ordinary light, i.e., a refractive index of linearly polarized light perpendicular to the long-axis direction of the liquid crystal molecule.

In another aspect, the present disclosure provides in some embodiments a display device, including a controller and a display assembly. The display assembly includes: a display module including a plurality of pixel islands arranged in an array foiiii; and a plurality of lens arrays laminated one on another at a light-exiting side of the display module. Each lens array of the plurality of lens arrays includes a substrate, a cover plate arranged opposite to the substrate, a first transparent electrode arranged at a side of the substrate facing the cover plate, a second transparent electrode arranged at a side of the cover plate facing the substrate, and a liquid crystal layer and a diffraction lens grating arranged between the first transparent electrode and the second transparent electrode. The diffraction lens grating includes a plurality of diffraction lens grating units corresponding to the plurality of pixel islands respectively. A voltage is applied to each of the first transparent electrode and the second transparent electrode in such a manner that a refractive index of a liquid crystal molecule in the liquid crystal layer is equal to or not equal to a refractive index of the diffraction lens grating. The controller is configured to control the voltage applied to each of the first transparent electrode and the second transparent electrode in each lens array of the plurality of lens arrays.

In some possible embodiments of the present disclosure, the display device further includes an eye tracking module configured to detect an eye position, and the controller is configured to control the voltage applied to each of the first transparent electrode and the second transparent electrode in each lens array of the plurality of lens arrays in accordance with a detection result of the eye position.

In some possible embodiments of the present disclosure, when the quantity of the a plurality of lens arrays is greater than 2, the controller is further configured to control the voltage applied to each of the first transparent electrode and the second transparent electrode in one lens array of the plurality of lens arrays in such a manner that the refractive index of the liquid crystal molecule in the liquid crystal layer of the lens array is not equal to the refractive index of the diffraction lens grating of the lens array, and control the voltage applied to each of the first transparent electrode and the second transparent electrode in each of the other lens arrays of the plurality of lens arrays in such a manner that the refractive index of the liquid crystal molecule in the liquid crystal layer of the other lens array is equal to the refractive index of the diffraction lens grating of the other lens array.

In some possible embodiments of the present disclosure, the display device further includes a detector configured to detect an eye position. The controller is further configured to control the voltage applied to each of the first transparent electrode and the second transparent electrode in one lens array of the plurality of lens arrays in accordance with the detected eye position in such a manner that the refractive index of the liquid crystal molecule in the liquid crystal layer of the lens array is not equal to the refractive index of the diffraction lens grating of the lens array, and control the voltage applied to each of the first transparent electrode and the second transparent electrode in each of the other lens arrays of the plurality of lens arrays in accordance with the detected eye position in such a manner that the refractive index of the liquid crystal molecule in the liquid crystal layer of the other lens array is equal to the refractive index of the diffraction lens grating of the other lens array.

In yet another aspect, the present disclosure provides in some embodiments a display method for the above-mentioned display device, including: controlling a voltage applied to each of the first transparent electrode and the second transparent electrode in one lens array of a plurality of lens arrays in such a manner that a refractive index of a liquid crystal molecule in the liquid crystal layer of the lens array is not equal to a refractive index of the diffraction lens grating of the lens array; and controlling a voltage applied to each of the first transparent electrode and the second transparent electrode in each of the other lens arrays of the plurality of lens arrays in such a manner that a refractive index of the liquid crystal molecule in the liquid crystal layer of the other lens array is equal to a refractive index of the diffraction lens grating of the other lens array.

In some possible embodiments of the present disclosure, the display method further includes detecting an eye position, and determining the one lens array in the plurality of lens arrays in accordance with the eye position.

BRIEF DESCRIPTION OF THE DRAWINGS

The present disclosure will be described hereinafter in conjunction with the drawings.

DETAILED DESCRIPTION

Figure 1:
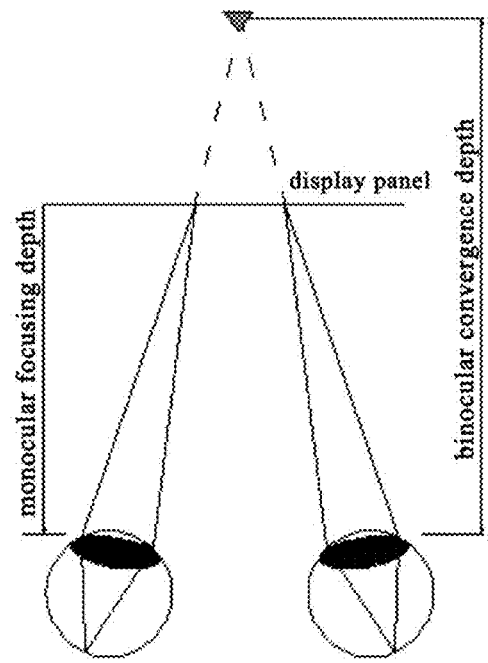
FIG. 1 is a schematic view showing a principle about the formation of a conflict between binocular convergence and monocular focusing in the related art.

The present disclosure will be described hereinafter in conjunction with the embodiments and drawings. An identical or similar reference numeral in the embodiments of the present disclosure represents an identical or similar element. The following embodiments are for illustrative purposes only, but shall not be used to limit the scope of the present disclosure.

Along with the development of society, currently normal 2D display cannot satisfy people's requirements in some ways, and it is hoped that a display device is capable of really restoring and displaying 3D information about a space. Through a 3D display technology, users are freed from a plane and feel like they are really there, so the 3D display technology has become a hot technology in the field of display.

The 3D display technology include glasses-based 3D display and glassless 3D display. In the glasses-based 3D display which is relatively mature now, a 3D image is displayed mainly by means of 3D glasses on the basis of such principles as deflection and filtration. The biggest drawbacks of the glasses-based 3D display technology come from that it cannot be freed from visual aids, the operation is complex and the user is easily fatigued. In the glassless 3D display technology, the user is not limited by the visual aid such as glasses any longer. As a basic principle of the mainstream glassless 3D display technology, a 3D image with parallax is displayed on a display panel, and received by right and left eyes of the user through a gating, e.g., a slit grating or lenticular lens grating, as a parallax splitter, and then combined in the brain to provide stereo vision.

A lenticular lens technology is also called as biconvex lens 3D technology or micro-lenticular lens 3D technology. As a principle of the lenticular lens 3D technology, a layer of lenticular lenses is added in front of the display panel, so that an image plane of a liquid crystal panel is located on a focal plane of the lens. In this way, a pixel of an image under each lenticular lens is divided into several subpixels, and the lenticular lens may project each subpixel in different directions. When the display panel is viewed by the eyes at different angles, different subpixels may be viewed.

The lenticular lens stereo grating consists of a plurality of small cylindrical lenses with same structural parameters and same properties. Due to this feature, the lenticular lens stereo grating is capable of compressing and isolating an image. A plurality of images taken at different images may be recorded by the lenticular lens stereo grating on a same picture in the form of strips. When being viewed, two different images about a same scene may be viewed by the eyes through a same kind of lenticular lens stereo grating, and thereby a depth image with a parallax, stereo effect may be generated in the brain.

However, for this display technology, there is a conflict between convergence and focal length. As shown in FIG. 1, a user's pupil is fully covered by an individual viewpoint, so that the eye is focused on a plane where the display panel is located. The 3D effect is generated when an image is viewed by the two eyes with two-eye convergence outside the display panel and then combined in the brain, so a monocular focus depth and a binocular convergence depth are not in a same plane which is different from a visual habit when a real world is viewed by the user. Hence, visual fatigue is caused in the case of long-term viewing.

Figure 2:
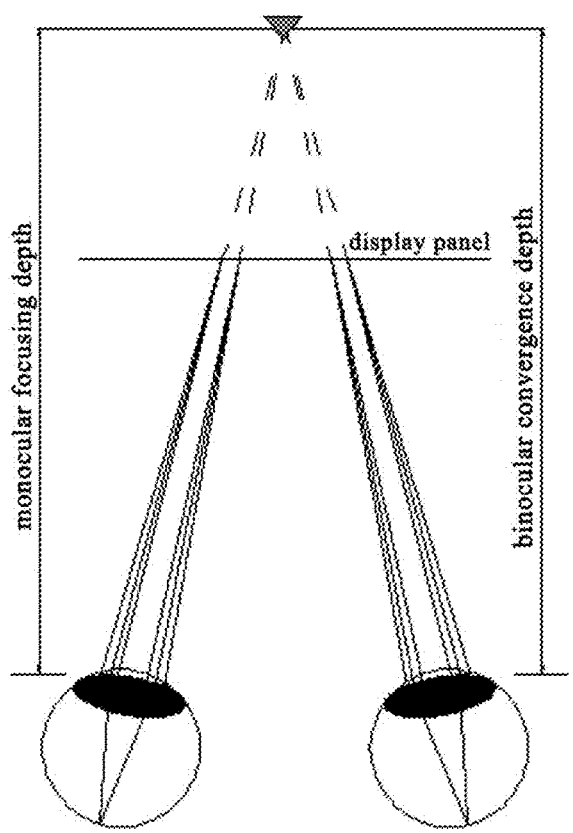
FIG. 2 is a schematic view showing a principle about the solution to the conflict between binocular convergence and monocular focusing through multi-viewpoints.

The conflict between the convergence and the focusing may be prevent through optical field display consisting of more than two viewpoints (multi-viewpoints) for the pupil. As shown in FIG. 2, for a single eye, each viewpoint merely covers a part of the pupil (smaller than or equal to a half of the pupil), so the single eye is focused on the 3D image, and the monocular focus depth and the binocular convergence depth are in the same plane, just like viewing a real 3D world. Hence, neither visual fatigue nor a sense of vertigo may occur.

However, in order to meet the requirement on viewing the image through two eyes, more than two viewpoints need to be formed in the pupil but the two eyes are required not to view a same pixel, so a 3D display device is provided with a very small viewing space.

In order to solve the problem that the viewing space is small, it is necessary to design some parameters of a lens array. It is found that, a range of the viewing space is greatly affected by an arrangement height of the lens array and an aperture of a lenticular lens.

A relationship between the arrangement height of the lens array and the aperture of the lenticular lens will be described hereinafter in a specific instance.

1. Arrangement Height H of Lens Array

Figure 3:
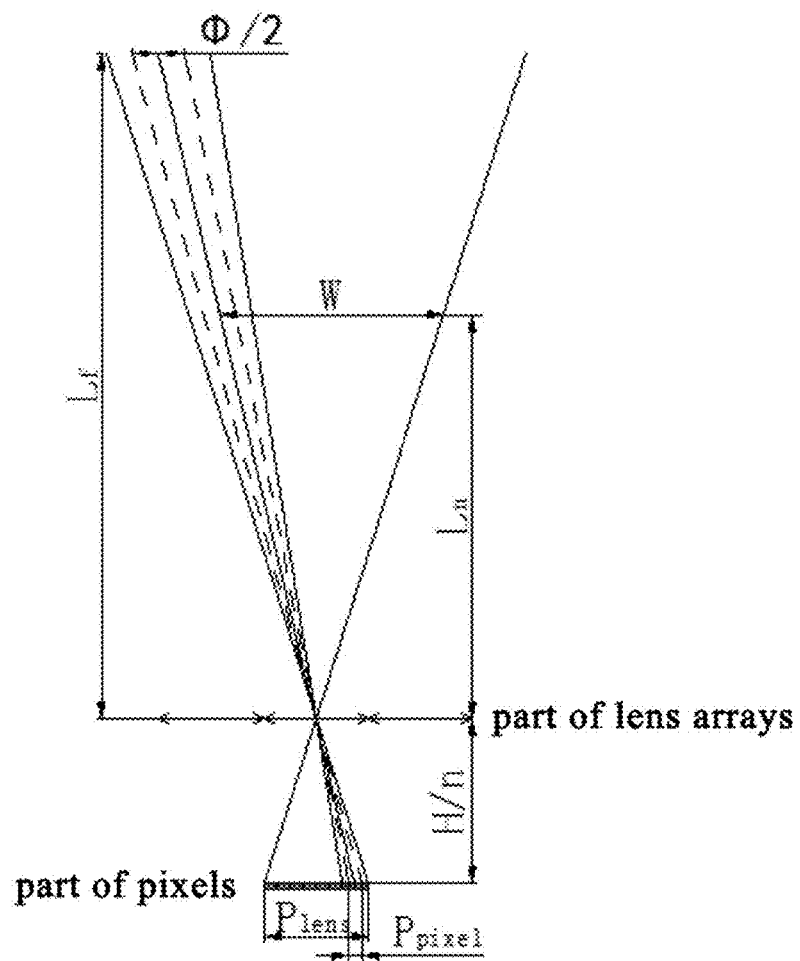
FIG. 3 is a schematic view showing a principle about an optical path after light from a subpixel passes through a lens array.

As shown in FIG. 3, the arrangement height H of the lens array is designed to enable a distance between centers of projections of beams from the subpixels, which are distanced from the display device within a distance $L_p$, is not greater than a half of a diameter of the pupil, so that multi-viewpoints (more than two viewpoints) are imaged by the display device in the pupil, where $L_f$ represents a furthest distance. It should be appreciated that, the furthest distance refers to a furthest distance at which more than two viewpoints are capable of being located in the pupil, i.e., the multi-viewpoints are located in the pupil only when the distance of the centers of the projections are within the furthest distance.

It should be appreciated that, the arrangement height H of the lens array may be a thickness of the lens array embedded in the display device.

As shown in FIG. 3, when the beams from the subpixels reach a position at a distance of $L_f$, the distance of the centers of two viewpoints formed in the pupil may be a half of the diameter of the pupil, i.e., $\Phi/2$. Based on a geometrical relationship in FIG. 3, the arrangement height H of the lens array and the furthest distance $L_f$ meet the following equation:

$$\frac{\Phi/2}{P_{pixel}} = \frac{L_f}{H/n}, \text{ i.e.,} \quad (1)$$

$$L_f = \frac{H\Phi}{2nP_{pixel}}, \quad (2)$$

where n represents a refractive index of a dielectric layer between the lens array and the subpixel (the dielectric layer is usually a transparent filler), $P_{pixel}$ represents a row pitch of subpixels arranged in an array form, and $\Phi$ represents the diameter of the pupil.

Based on the above equations (1) and (2), the lenticular lenses arranged at different heights may correspond to different furthest distances.

For example, when n=1.5 $P_{pixel}$=14 μm, $\Phi$=4 mm and H=5.25 mm, $L_f$=500 mm, i.e., when a distance between the eye and the display device is smaller than or equal to 500 mm, the multi-viewpoints may be formed in the pupil.

In the case of the other parameters remain unchanged, a value of $L_f$ may change along with the arrangement height H of the lens array. For example, when H=5.775 mm, $L_f$=550 mm, i.e., when a distance between the eye and the display device is smaller than or equal to 550 mm, the multi-viewpoints may be formed in the pupil.

It should be appreciated that, the value of the furthest distance may increase through increasing a value of the arrangement height of the lens array, so as to expand the range of the viewing space. However, a volume of the display device may increase along with an increase in the arrangement height. Hence, in actual use, such factors as the volume of the display device shall be taken into consideration, so as to select an appropriate arrangement height.

2. Aperture of Lens Array

The aperture of the lens array is designed so as to form a continuous viewing space of the multi-viewpoints. The viewing space may be continuous in two directions, i.e., (1) in a transverse direction (a direction parallel to a plane where the display device is located, and (2) in a lateral direction (a direction perpendicular to the plane where the display device is located).

(1) The viewing space is continuous in the transverse direction.

In order to enable the viewing space to be continuous in the transverse direction, a row pitch of the lens array may be an integral multiple of a length of the subpixel, and the subpixels which are spaced apart from each other at a distance equal to the row pitch may be combined to form a pixel island.

It should be appreciated that, each pixel island is a member of the display module for display. Usually, one pixel island includes several to dozens of pixel units. The pixel island may emit light, e.g., red light, blue light and green light, in the case of being energized. In the embodiments of the present disclosure, each pixel unit in the pixel island for display may be an Organic Light-Emitting Diode (OLED), but the present disclosure will not be limited thereto. The pixel unit may be any other pixel unit of a display element for display, e.g., a pixel of a Liquid Crystal Display (LCD), which will not be particularly defined herein.

Figure 4A:
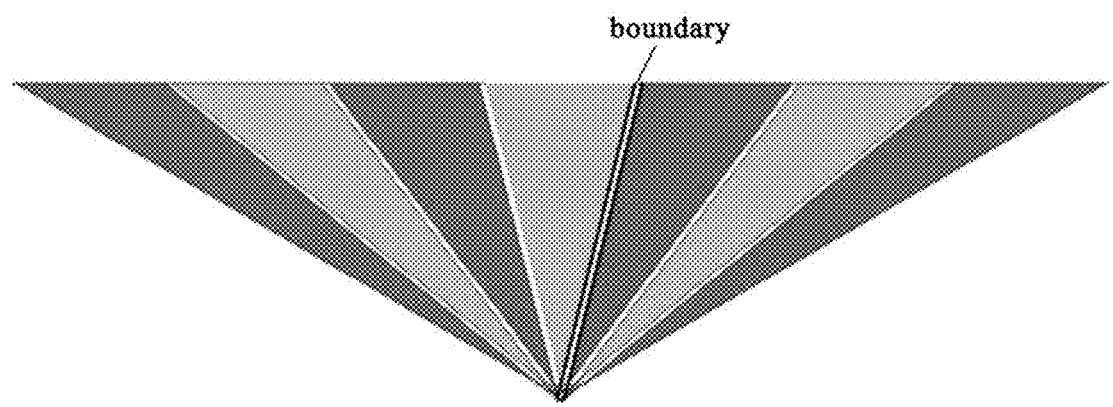
FIGS. 4A and 4B are schematic views showing optical fields after the light from the subpixels passes through the lens array.
Figure 4B:
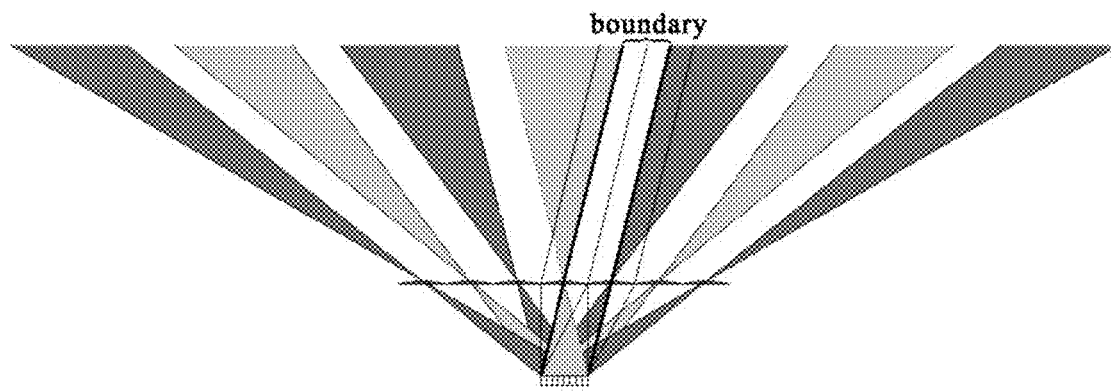

As shown in FIG. 4 (FIG. 4B is a topical enlarged view of FIG. 4A), adjacent projection regions formed in a space after the light from the pixel island passes through the lenticular lenses are tangent to each other (in FIG. 4, two black bold lines are boundaries of two adjacent viewing regions, and they are parallel to each other at a distance equal to the aperture of the lenticular lens; actually, a width of each black bold line is also equal to the aperture of the lenticular lens, so any two boundaries are in immediate contact with each other). Hence, the pixel island may be viewed by the eye at any position in the space, and the viewing space may be continuous in the transverse direction.

(2) The viewing space is continuous in the lateral direction.

When an optical field 3D display consisting of multi-viewpoints is to be achieved through the pupils of the eyes, it is required not only that a plurality of viewpoints needs to enter the pupil, but also that a same subpixel is not viewed by the two eyes. In addition, in order to prevent the occurrence of a drawing layout conflict, a same subpixel cannot be viewed by the eyes at any possible positions where the eyes are located due to an average pixel error. Referring to FIG. 3, there exists a nearest distance Ln in the viewing space (i.e., a nearest distance at which a same subpixel is not viewed by the two eyes simultaneously). Through designing the aperture of the lenticular lens, it is able to provide a certain range between the nearest distance and the furthest distance. Then, through adjusting the arrangement height of the lens array, regions in the viewing space may be in immediate contact with each other, so as to enable the viewing space to be also continuous in the lateral direction, thereby to expand the multi-viewpoint viewing space for the pupil.

Figure 5:
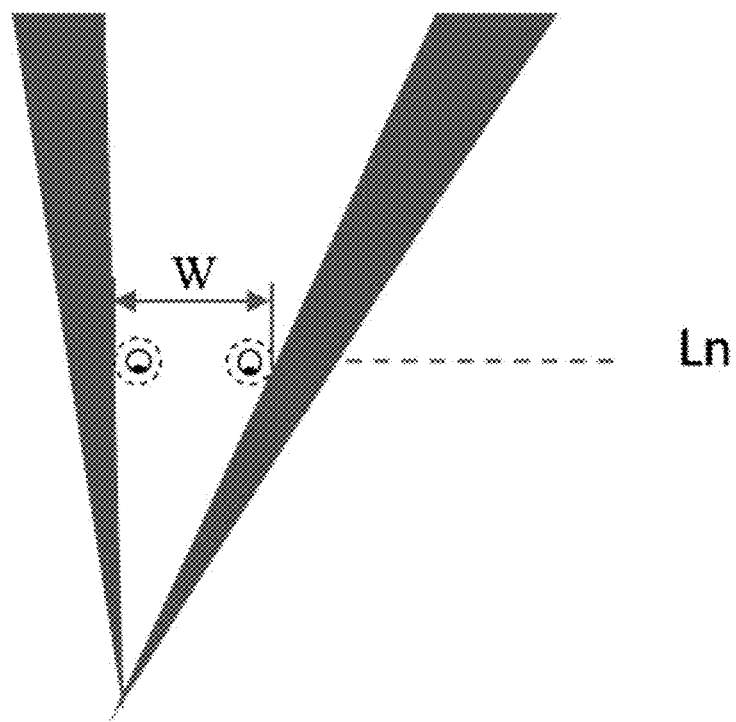
FIG. 5 is a schematic view showing a situation where light from the subpixels enter different eyes.

As shown in FIG. 5, in order to prevent a same subpixel from being viewed by the eyes at any possible positions, after the light from the same subpixel passes through different lenses and reaches a position at a distance of Ln, a projection width w of the light needs to meet the following equation: $W=D+\Phi+2L_n \tan \varepsilon$ (3), where D represents a pupil distance (a distance between two eyes), $\Phi$ represents the diameter of the pupil, and $\varepsilon$ represents average pixel accuracy.

Based on the geometrical relationship in FIG. 5, $$\frac{P_{lens} - P_{pixel}}{W} = \frac{H/n}{L_n}, \text{ i.e.,} \quad (4)$$

$$L_n = \frac{H(D + \Phi)}{n(P_{lens} - P_{pixel}) - 2H\tan\varepsilon}, \quad (5)$$

where $P_{lens}$ represents a row pitch of the lenticular lenses. Based on the equation (5), the larger the value of $P_{lens}$, the smaller the value of Ln, i.e., the larger the row pitch of the lenticular lenses, the smaller the value of Ln.

It should be appreciated that, the range between the nearest distance and the furthest distance may be just a viewing range of the multi-viewpoints in the pupil corresponding to the lens array. Based on the above, the furthest distance for the multi-viewpoints is merely related to the arrangement height of the lens array. Hence, after the arrangement height has been determined, when the row pitch ($P_{lens}$) of lenticular lenses is larger, the furthest distance of the viewing range may be fixed, and the nearest distance may be smaller, i.e., the viewing space of the multi-viewpoints in the pupil corresponding to the lens array at the arrangement height may be larger in the lateral direction.

Figure 6:
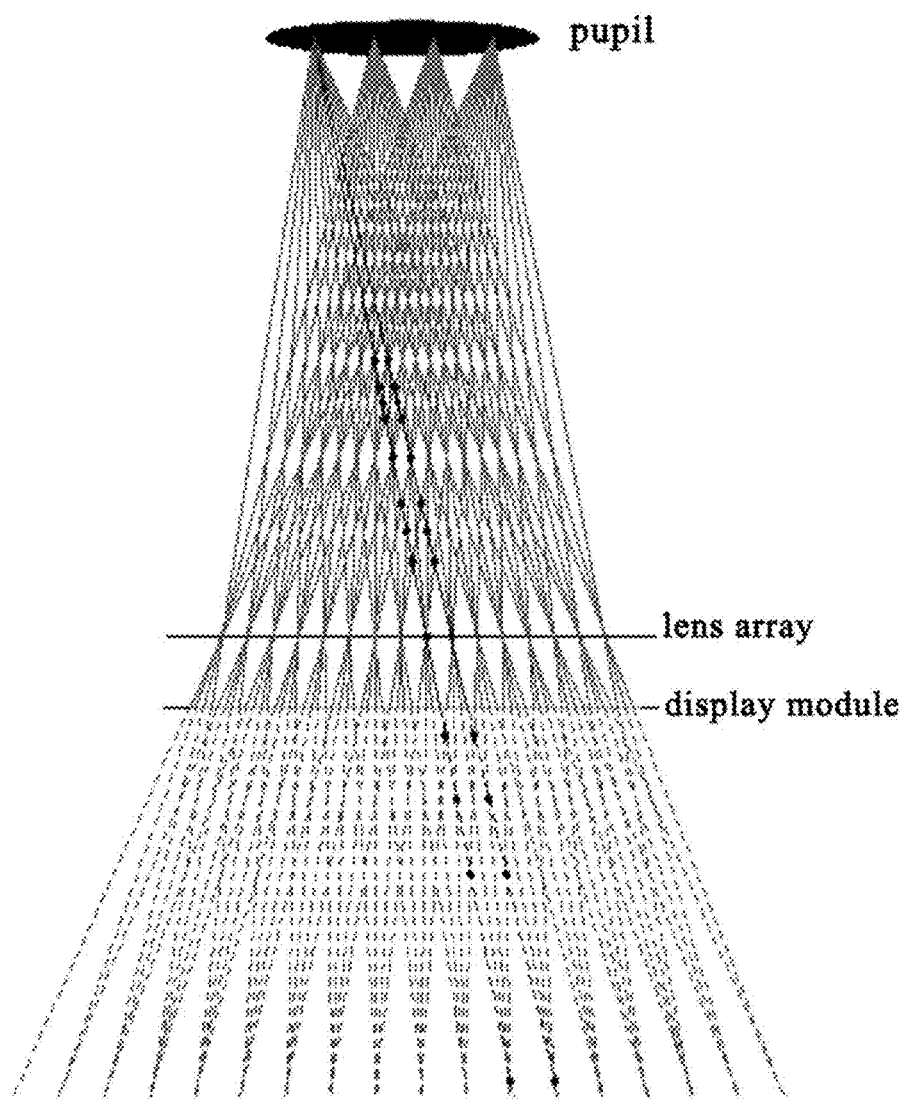
FIG. 6 is a schematic view showing the multi-viewpoints formed by the light from the subpixels in a pupil.

However, the larger the row pitch ($P_{lens}$) of the lenticular lenses, the smaller the resolution of the optical field display. To be specific, as shown in FIG. 6, an angle between adjacent image points in each depth of field plane relative to the eye is equal, so a resolution of an image for the optical field display may be defined using an angular resolution, specifically through the following equation:

$$\alpha = \frac{P_{lens}}{L} * \frac{180}{\pi} *60, \quad (6)$$

where α represents an angle of resolution in unit of minute of arc ('), and L represents a viewing distance. It should be appreciated that, the smaller the value of α, the larger the angular resolution. For example, when the angle of resolution is 1', there may exist 60 pixels within a viewing field of 1°; and when the angle of resolution is 2', there may exist 30 pixels within the viewing field of 1°, i.e., the resolution with 60 pixels may be greater than that with 30 pixels. In other words, the smaller the value of α, the larger the resolution of the image for the optical field display. Based on the above equation, in the case that the viewing distance L is constant, the smaller the row pitch ($P_{lens}$) of the lenticular lenses, the smaller the value of α and the larger the resolution of the image for the optical field display.

Based on the above, the viewing space for the multi-viewpoints in the pupil may be expanded in the lateral direction through increasing the row pitch ($P_{lens}$) of the lenticular lenses, but the larger the row pitch ($P_{lens}$) of the lenticular lenses, the smaller the resolution for the optical field display. Hence, a specific value of the row pitch ($P_{lens}$) of the lenticular lenses may be selected in accordance with an actual application scenario.

It should be appreciated that, the row pitch of the lenticular lenses may be just the aperture of the lens array.

Based on the above, the size of the viewing space for the display device may change through adjusting the arrangement height of the lens array or the aperture of the lens array.

Figure 7:
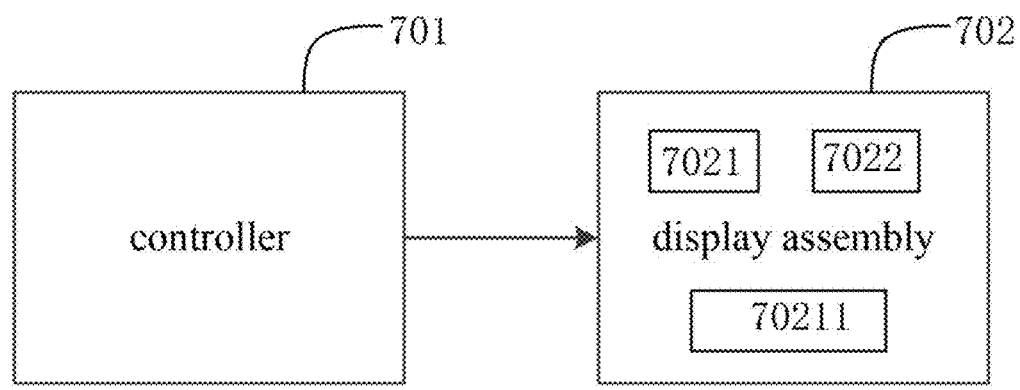
FIG. 7 is a schematic view of a display device according to one embodiment of the present disclosure.

Based on the above design principle, as shown in FIG. 7, the present disclosure provides in some embodiments a display device, which includes a controller 701 and a display assembly 702.

The display assembly includes a display module 7021 and a plurality of lens arrays 7022 laminated one on another at a light-exiting side of the display module 7021.

The display module includes a plurality of pixel islands 70211 arranged in an array form.

Figure 8:
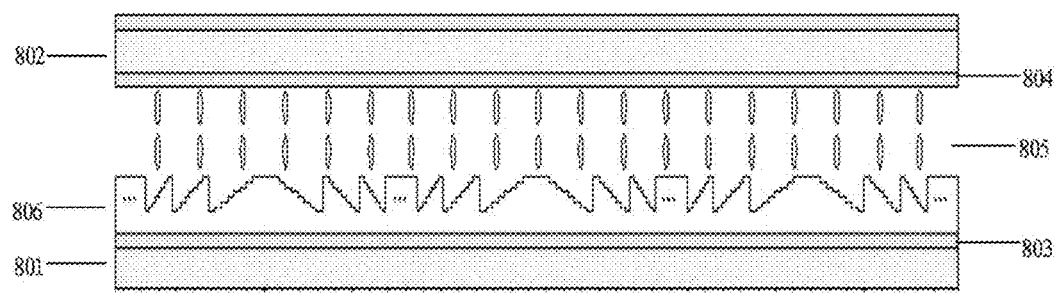
FIG. 8 is a schematic view showing a display assembly according to one embodiment of the present disclosure.

As shown in FIG. 8, each lens array of the plurality of lens arrays includes a substrate 801, a cover plate 802 arranged opposite to the substrate 801, a first transparent electrode 803 arranged at a side of the substrate 801 facing the cover plate 802, a second transparent electrode 804 arranged at a side of the cover plate 802 facing the substrate 801, and a liquid crystal layer 805 and a diffraction lens grating 806 arranged between the first transparent electrode 803 and the second transparent electrode 804. The diffraction lens grating 806 includes a plurality of diffraction lens grating units 8061 corresponding to the plurality of pixel islands 70211 respectively. A voltage is applied to each of the first transparent electrode 803 and the second transparent electrode 804 in such a manner that a refractive index of a liquid crystal molecule in the liquid crystal layer 805 is equal to or not equal to a refractive index of the diffraction lens grating 806.

Figure 9:
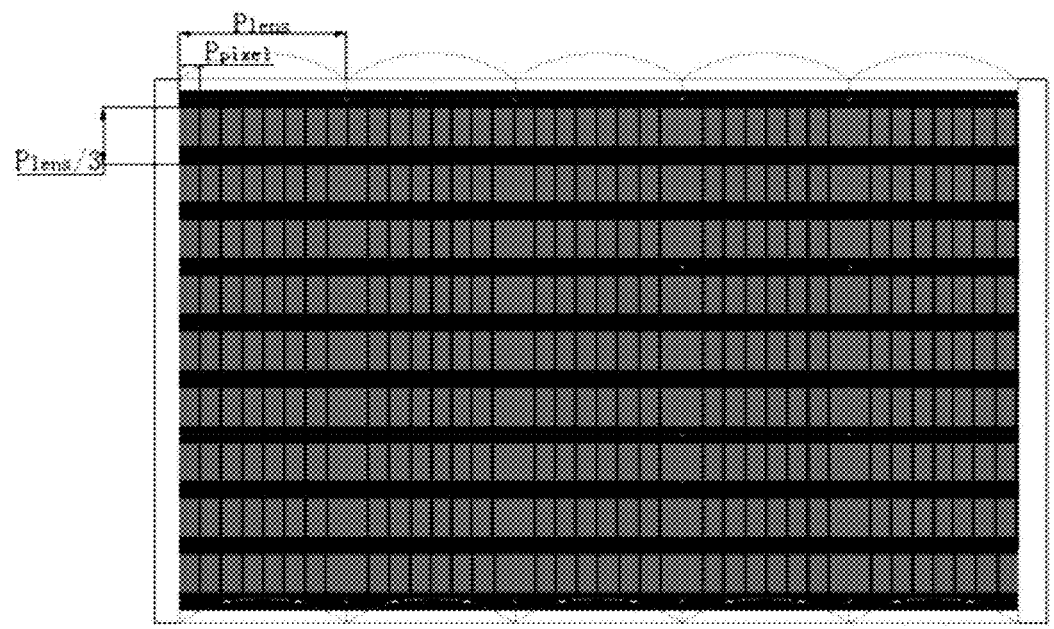
FIG. 9 is a comparison diagram between a size of a diffraction lens grating unit and a size of a subpixel according to one embodiment of the present disclosure.

As mentioned hereinabove, in order to ensure the continuous viewing space in the transverse direction, the row pitch of the lenticular lenses needs to be an integral multiple of a length of the subpixel. Hence, as shown in FIG. 9, in some embodiments of the present disclosure, a length of each pixel in the pixel island may be set as approximately one third of a width of the diffraction lens grating unit.

It should be appreciated that, the width of the diffraction lens grating unit may also be designed in accordance with the length of the subpixel, i.e., width of the diffraction lens grating unit may be set as approximately three times the length of each subpixel in the pixel island.

Illustratively, liquid crystal is an organic compound or a mixture of organic compounds, and it has a special state. On one hand, it has fluidity like a liquid; on the other hand, its molecules are arranged neatly in a certain direction and it has anisotropy like a crystal. Based on this feature, the liquid crystal is unstable. The arrangement of the liquid crystal molecules and thereby an optical property may change along with a change in an external environment, e.g., temperature or electric field.

For example, in the case that no voltage is applied, the liquid crystal molecule may be in a state with a high refractive index, and in the case that a voltage is applied to the electrodes at two ends of the liquid crystal molecule, the liquid crystal molecule may be in a state with a low refractive index. This is because, when the voltage is applied to the transparent electrodes at two ends of the liquid crystal layer, the liquid crystal molecule may stand up under the effect of a vertical electric field generated between the electrodes, and a long-axis direction of the liquid crystal molecule may be perpendicular to a light polarization direction. At this time, the liquid crystal layer may be in a state with a low refractive index.

Based on the above, as shown in FIG. 8, when the voltage is applied to each of the first transparent electrode and the second transparent electrode, the long-axis direction of the liquid crystal molecule may be substantially perpendicular to the light polarization direction, so that the liquid crystal layer may be in the state with the low refractive index. In this way, the refractive index of the liquid crystal molecule in the liquid crystal layer may not be equal to the refractive index of the diffraction lens grating, and the diffraction lens grating may perform directional modulation on an emergent light beam so as to turn on the lens array.

On the contrary, when no voltage is applied to the first transparent electrode and the second transparent electrode, the liquid crystal layer may be in a state with a high refractive index, and the refractive index of the diffraction lens grating may be the same as that of the liquid crystal layer, i.e., it is equivalent to that the liquid crystal layer and the diffraction lens grating may form one piece. At this time, the entire layer of lens arrays may function as a glass plate, and the lens array may be turned off.

Figure 10:
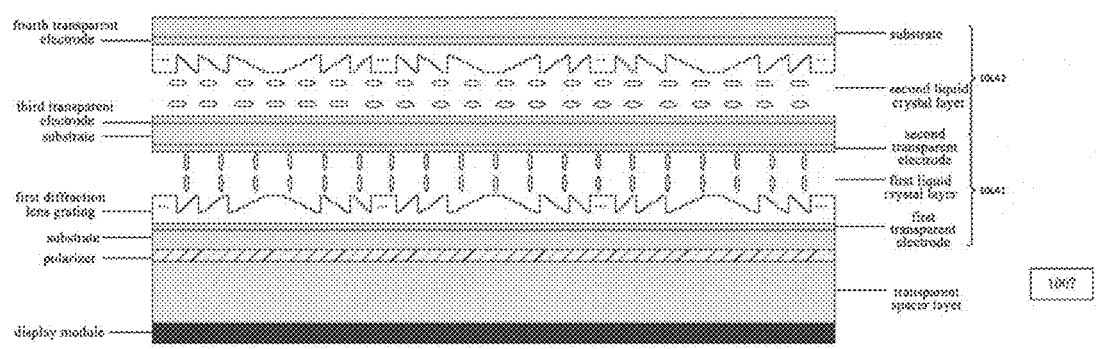
FIG. 10 is a schematic view of the display device where a first lens array is turned on and a second lens array is turned off according to one embodiment of the present disclosure.

As shown in FIG. 10, in some embodiments of the present disclosure, the display assembly further includes a polarizer 1003 arranged between the display module 1001 and the lens array 1002, so as to allow light from the display module 1001 in a polarization direction parallel to an optical axis of the polarizer 1003 to pass therethrough. In addition, the long-axis direction of the liquid crystal molecule in a first liquid crystal layer 1004 in an initial alignment direction may be parallel to the optical axis of the polarizer 1003, so as to ensure that the long-axis direction of the liquid crystal molecule is parallel to the polarization direction of the light from the pixel island, thereby to prevent a display effect from being adversely affected by scattering light.

In some possible embodiments of the present disclosure, as shown in FIG. 10, a controller 1007 is configured to control the voltage applied to a first transparent electrode 1005 and a second transparent electrode 1006 of the lens array.

Figure 11:
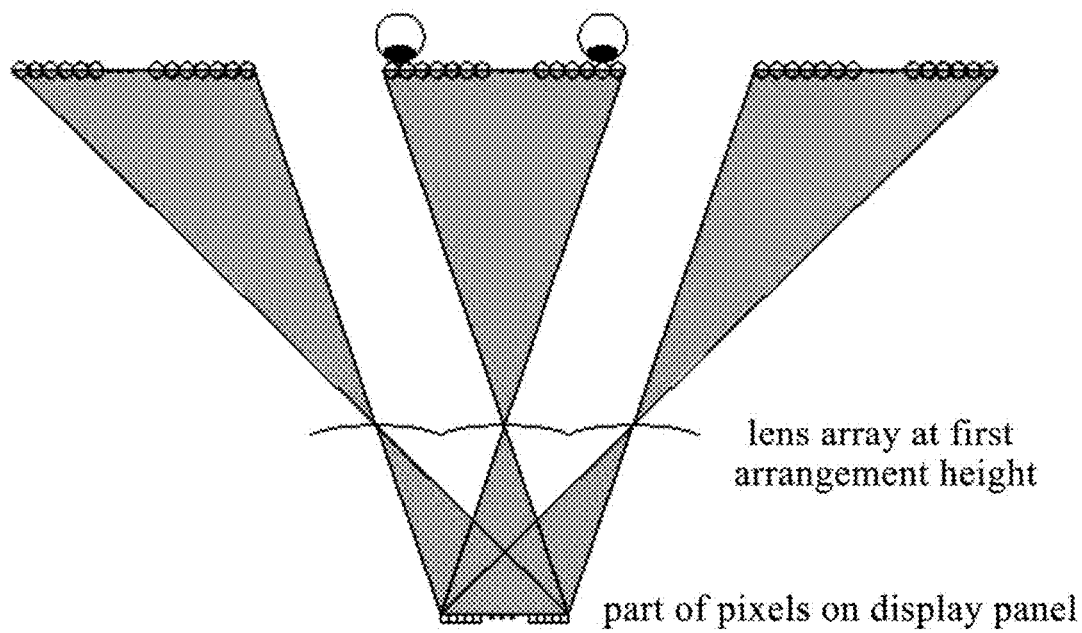
FIG. 11 is a schematic view showing an effect of an optical field for the display device where the first lens array is turned on and the other lens array is turned off according to one embodiment of the present disclosure.

In some possible embodiments of the present disclosure, as shown in FIG. 10, through the controller 1007, the voltage may be applied to each of the first transparent electrode 1005 and the second transparent electrode 1006 of a first lens array 10LA1, and the liquid crystal molecule may stand up under the effect of the vertical electric field generated between the electrodes. At this time, the long-axis direction of the liquid crystal molecule may be perpendicular to the light polarization direction, and the first liquid crystal layer 1008 may be in a state with a low refractive index, i.e., the first lens array may be turned on. No voltage may be applied to a third transparent electrode 1009 and a fourth transparent electrode 1010 of a second lens array 10LA2, and a second liquid crystal layer 1011 may be in a state with a high refractive index. At this time, a refractive index of the second liquid crystal layer 1011 may be equal to a refractive index of a second diffraction lens grating unit, i.e., the second lens array may be turned off, so as to achieve the optical field display for more than two viewpoints in the pupil at a relatively small distance as shown in FIG. 11.

Figure 12:
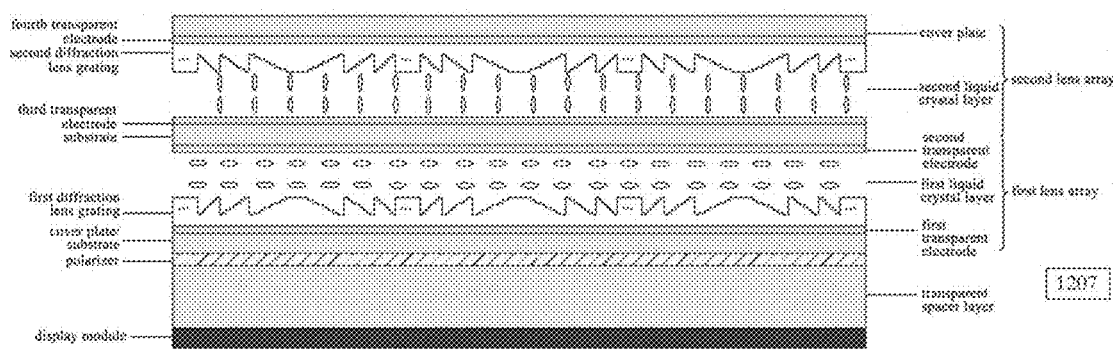
FIG. 12 is a schematic view of the display device where the first lens array is turned off and the second lens array is turned on according to one embodiment of the present disclosure.
Figure 13:
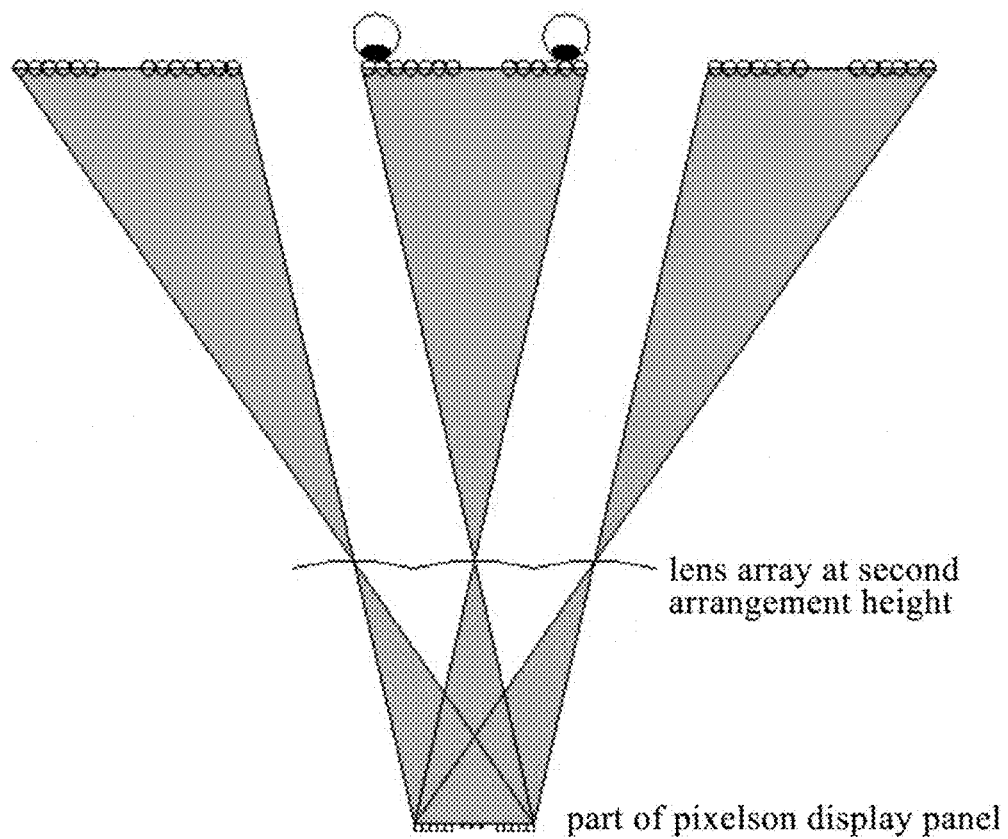
FIG. 13 is a schematic view showing an effect of the optical field for the display device where the second lens array is turned on and the other lens array is turned off according to one embodiment of the present disclosure.

As shown in FIG. 12, through a controller 1207, no voltage may be applied to a first transparent electrode 1205 and a second transparent electrode 1206 of a first lens array 12LA1, and a first liquid crystal layer 1204 may be in a state with a high refractive index. At this time, a refractive index of a first liquid crystal layer 1204 may be the same as that of a first diffraction lens grating unit, i.e., the first lens array 12LA1 may be turned off. A voltage may be applied to a third transparent electrode 1209 and a fourth transparent electrode 1210 of a second lens array 12LA2, and the liquid crystal molecule may stand up under the effect of a vertical electric field generated between the electrodes. At this time, the long-axis direction of the liquid crystal molecule may be perpendicular to the light polarization direction, and a second liquid crystal layer 1211 may be in a state with a low refractive index, i.e., the second lens array 12LA2 may be turned on, so as to achieve the optical field display for more than two viewpoints in the pupil at a relatively large distance as shown in FIG. 13.

It should be appreciated that, FIGS. 10 and 12 merely show a part of lens arrays and a part of the display module, rather than the entire display device. In addition, the description is given by taking two groups of lens arrays as an example. On the premise that a main idea of the present disclosure is not affected, a person skilled in the art may set the lens arrays in any other amount without any creative effort.

In some embodiments of the present disclosure, a distance between the lens array and the display module (i.e., the arrangement height H) and a width of the diffraction lens grating unit (i.e., the aperture of the lens array) may be determined in accordance with a viewing space and a resolution of multi-viewpoint optical field display.

In the embodiments of the present disclosure, how to select the quantity of the lens arrays will be described hereinafter.

In the case that a refractive index n of a dielectric layer between the lens array and the subpixel is 1.5, a row pitch $P_{pixel}$ of subpixels is 14 μm, a diameter $\Phi$ of the pupil is 4 mm, average pixel accuracy is 0.5°, and $P_{lens}$=686 μm, (1) when H=5.25 mm, $L_n$=395.3 mm, $L_f$=500 mm, and a viewing space for the display device in the lateral direction may be 395.3 ⸺ 500 mm; and (2) when H=6.3 mm, $L_n$=484.1 mm, $L_f$=600 mm, and a viewing space for the display device in the lateral direction may be 484.1 ⸺ 600 mm.

Hence, for the aperture of the lenticular lens $P_{lens}$=686 μm, when the to-be-acquired viewing space for the display device in the lateral direction is a continuous viewing space of 400 ⸺ 600 mm for multi-viewpoints in the pupil, it is necessary to switch between two kinds of lens arrays at different arrangement heights, i.e., a first lens array at an arrangement height H=5.25 mm and a second lens array at an arrangement height H=6.3 mm. For this display device, at a viewing distance of 500 mm, a resolution of a detected optical field image is 4.72', which meets the requirement on the resolution of the display device.

When a viewing distance is 400 ⸺ 500 mm, the lens array at the arrangement height H=5.25 mm may be turned on, and the lens array at the arrangement height H=6.3 mm may be turned off. When a viewing distance is 500 mm to 600 mm, the lens array at the arrangement height H=6.3 mm may be turned on, and the lens array at the arrangement height H=5.25 mm may be turned off.

In this regard, it is able to expand the range of the viewing space for the display device.

In order to achieve a larger resolution for the optical field display, the aperture of the lenticular lens may be reduced appropriately. To be specific, in the case that the other parameters are constant and $P_{lens}$=616 μm, (1) when H=4.725 mm, $L_n$=397.3 mm, $L_f$=450 mm, and a viewing space for the display device in the lateral direction may be 397.3 ⸺ 450 mm; (2) when H=5.25 mm, $L_n$=446.5 mm, $L_f$=500 mm, and a viewing space for the display device in the lateral direction may be 446.5 ⸺ 500 mm; (3) when H=5.775 mm, $L_n$=496.7 mm, $L_f$=550 mm, and a viewing space for the display device in the lateral direction may be 500 ⸺ 550 mm; and (4) when H=6.3 mm, $L_n$=548.1 mm, $L_f$=600 mm, and a viewing space for the display device in the lateral direction may be 548.1 ⸺ 600 mm.

Hence, for the aperture of the lenticular lens $P_{lens}$=616 μm, when the to-be-acquired viewing space for the display device in the lateral direction is a continuous viewing space of 400 ⸺ 600 mm for multi-viewpoints in the pupil, it is necessary to switch among four kinds of lens arrays at different arrangement heights, i.e., a first lens array at an arrangement height H=4.725 mm, a second lens array at an arrangement height H=5.25 mm, a third lens array at an arrangement height H=5.775 mm, and a fourth lens array at an arrangement height H=6.3 mm. For this display device, at a viewing distance of 500 mm, a resolution of a detected optical field image is 4.24', which is higher than that when the lens arrays are arranged at two different arrangement heights.

When a viewing distance is 400 ⸺ 450 mm, the lens array at the arrangement height H=4.725 mm may be turned on, and the other lens arrays may be turned off; when a viewing distance is 450 ⸺ 500 mm, the lens array at the arrangement height H=5.52 mm may be turned on, and the other lens arrays may be turned off; when a viewing distance is 500 ⸺ 550 mm, the lens array at the arrangement height H=5.775 mm may be turned on, and the other lens arrays may be turned off; and when a viewing distance is 550 ⸺ 600 mm, the lens array at the arrangement height H=6.3 mm may be turned on, and the other lens arrays may be turned off.

It should be appreciated that, the diffraction lens grating unit in the lens array may be a main member for the 3D display. After the arrangement height of the lens array and the aperture of the lens, in order to achieve the 3D display, a divergence angle of the light from the pixel needs to be reduced, so that a projection width of the subpixel is smaller than a half of the diameter of the pupil. At this time, the pixel needs to be on a focus plane of the lenticular lens, so parameters of the diffraction lens grating need to be designed in accordance with the arrangement height of the lens array and the aperture of the lens.

To be specific, there may further exist a relationship between a focal lend of the lens and the arrangement height of the lens array, specifically expressed through the following equation:

$$f = \frac{H}{n}, \quad (7)$$

where n represents the refractive index of the dielectric layer between the lens array and the subpixel. In order to enable the subpixel to be at a position distanced from the lens by a focal length and achieve the 3D display, the parameters of the diffraction lens grating also need to be designed.

In addition, as shown in FIG. 10, the dielectric layer is a transparent spacer layer 1012, usually an organic adhesive layer (made of various transparent adhesives) or a transparent substrate (made of Polyethylene Terephthalate (PET) or glass).

Figure 14:
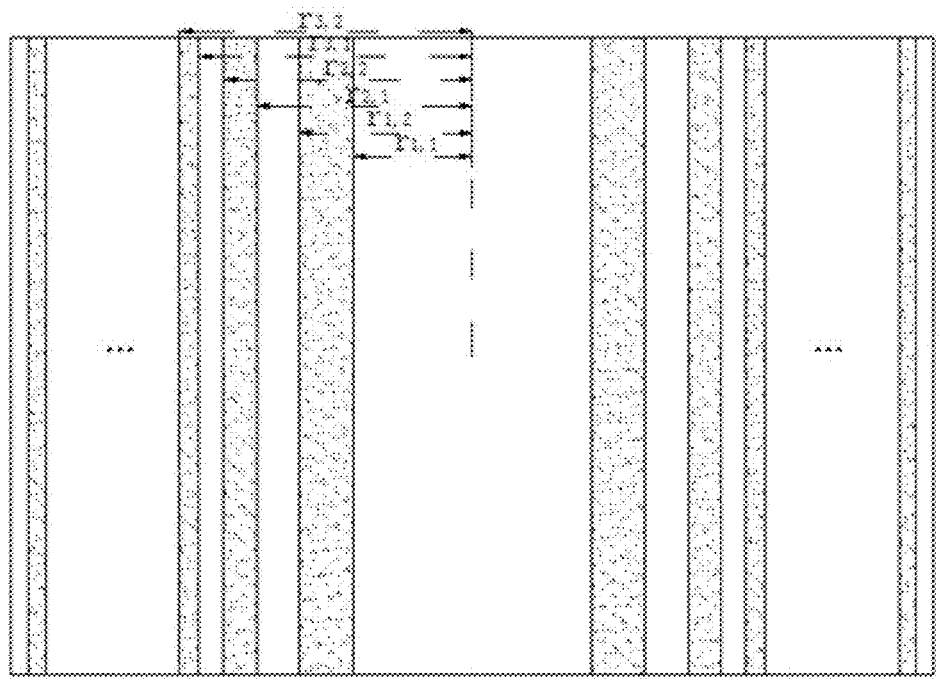
FIG. 14 is a partial top view of a 2-step phase diffraction lens grating according to one embodiment of the present disclosure.
Figure 15:
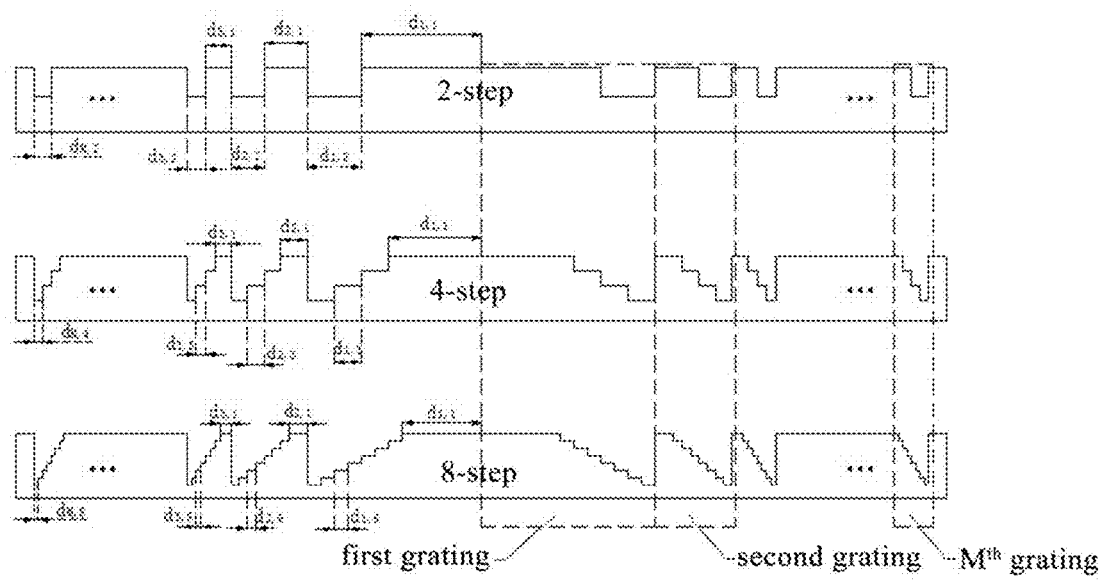
FIG. 15 is a partial sectional view of 2-step, 4-step and 8-step phase diffraction lens gratings according to one embodiment of the present disclosure.

FIGS. 14 and 15 show the diffraction lens grating of one lens in the lens array. The diffraction lens grating consists of phase diffraction gratings, and it is formed on an upper substrate or a lower substrate of the liquid crystal layer.

To be specific, FIG. 14 is a partial top view of a 2-step phase diffraction lens grating, and FIG. 15 is a partial sectional view of 2-step, 4-step and 8-step phase diffraction lens gratings. The diffraction lens grating with different steps may have different diffraction efficiency. The larger the quantity of steps, the higher the diffraction efficiency, and the more difficult the manufacture process. In the embodiments of the present disclosure, the 8-step phase diffraction lens grating may be selected.

In FIG. 14, the diffraction lens grating includes first to $M^{th}$ annular phase grating units, where M is a positive integer. Each grating unit includes N steps (N=2^m(m=1, 2, 3 ... )), a phase difference between adjacent steps is $2\pi/N$, and a height of the step is expressed through the following equation:

$$h = \frac{\lambda/N}{n_e - n_o}, \quad (8)$$

where $\lambda$ represents a wavelength of incident light (when the incident light is polychromatic light, usually $\lambda$=555 nm), $n_e$ represents a high refractive index of the liquid crystal molecule (also called as a refractive index of abnormal light, i.e., linearly polarized light parallel to the long-axis direction of the liquid crystal molecule, or a refractive index of a grating material), and $n_o$ represents a low refractive index of the liquid crystal molecule (also called as a refractive index of ordinary light, i.e., linearly polarized light perpendicular to the long-axis direction of the liquid crystal molecule).

For the phase diffraction lens grating in FIG. 14, a distance between a centrosymmetric line and an edge of an $i^{th}$ step in an $j^{th}$ grating unit away from the centrosymmetric line is $r_{j,i}$, where j is a positive integer smaller than or equal to M, and i is a positive integer smaller than or equal to N. In FIG. 14, j is 1 to 3, and i is 1 to 2. Depending on the property of the diffraction lens, there is a relationship between $r_{j,i}$ and a focal length f of the diffraction lens, specifically expressed through the following equation:

$$r_{j,i} = \sqrt{\left[f_1 + \left(j - 1 + \frac{i}{N}\right)\lambda\right]^2 - f_1^2} = \quad (9)$$

$$\sqrt{\left[\left(j - 1 + \frac{i}{N}\right)\lambda\right]^2 + 2\left(j - 1 + \frac{i}{N}\right)\lambda f_1}.$$

The width of each step in the diffraction lens grating may be calculated on the basis the above equation (9), specifically expressed through the following equation: $d_{j,i} = r_{j,i} - r_{j,i-1}$ (10).

A parameter distribution of heights and widths of the steps of the diffraction lens grating at any focal length may be calculated in accordance with the height h of each step, the relationship between $r_{j,i}$ and the focal length f of the diffraction lens, and the width $d_{j,i}$ of the each step.

Taking a liquid crystal molecule with a model type SLC123320 as an example, for refractive indices of the liquid crystal molecule, $n_e$=1.821, $n_o$=1.522 and $\Delta n = n_e - n_o$=0.299. A design height of each step may be calculated in combination with the height h of the step. For example, when $\lambda$=555 nm and N=2, h=928.1 nm; and when $\lambda$=555 nm and N=4, h=464 nm; and when $\lambda$=555 nm and N=8, h=232 nm.

When designing the diffraction lens array with H=5.25 mm and $P_{lens}$=686 μm, it may be calculated in accordance with the relationship between the focal length of the diffraction lens and the arrangement height that f=3.5 mm, and then the distribution of the widths of the steps may be acquired in accordance with the relationship between $r_{j,i}$ and the focal length f of the diffraction lens as well as the width $d_{j,i}$ of each step.

Figure 16:
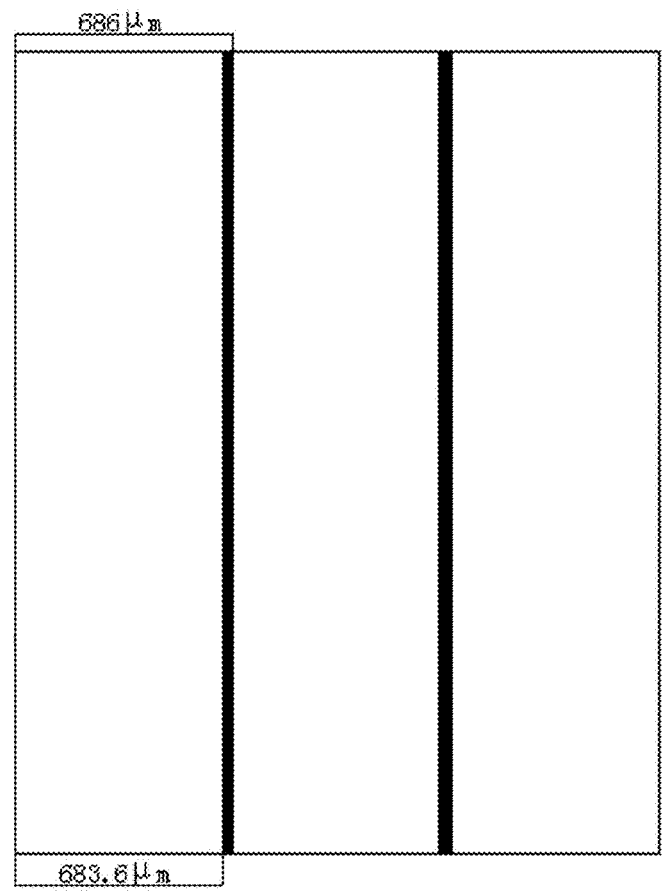
FIG. 16 is a schematic view showing a situation where a region free of diffraction grating is shielded by Black Matrices (BMs)

For example, for the 8-step phase diffraction lens grating (N=8), the distribution of the widths of the steps may be $d_{1,1}$=22.0 μm, $d_{1,2}$=9.1 μm, $d_{1,3}$=7.0 μm, $d_{1,4}$=5.9 μm, ..., and $d_{30,8}$=0.7 μm. The aperture of the lenticular lens acquired through calculation may be $P_{lens}$=2*$r_{30,8}$=683.6 μm. However, an actually-required aperture of the lenticular lens is $P_{lens}$=686 μm. Hence, a distance between the lenticular lenses needs to be designed as that shown in FIG. 16, and a region without any diffraction lens grating may be shielded by a BM, so as to prevent the interference caused by scattering light.

Figure 17:
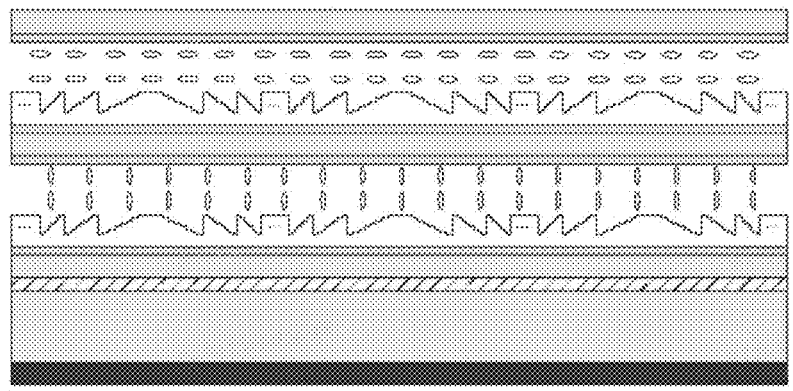
FIG. 17 is a schematic view showing a diffraction lens grating unit according to one embodiment of the present disclosure.
Figure 18:
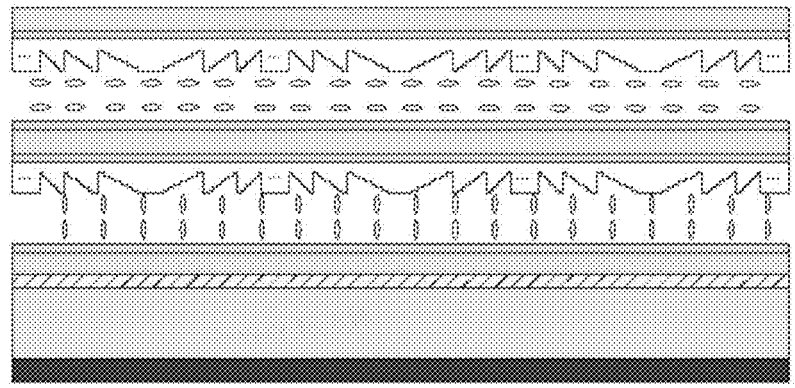
FIG. 18 is another schematic view showing the diffraction lens grating unit according to one embodiment of the present disclosure.
Figure 19:
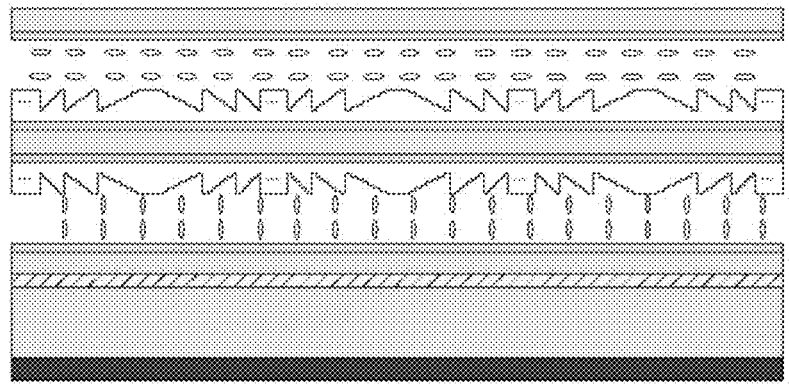
FIG. 19 is yet another schematic view showing the diffraction lens grating unit according to one embodiment of the present disclosure.
Figure 20:
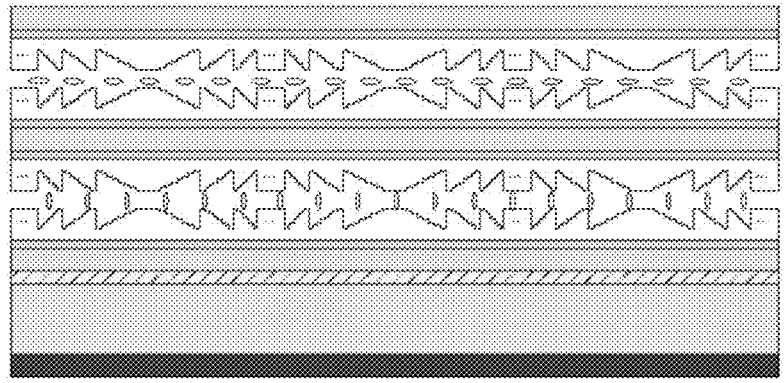
FIG. 20 is still yet another schematic view showing the diffraction lens grating unit according to one embodiment of the present disclosure.

It should be appreciated that, the diffraction lens grating may be formed on an upper substrate or a lower substrate of the liquid crystal layer in various ways. Taking two layers of lenticular lens arrays whose arrangement heights may be switched as an example, the diffraction lens gratings may be formed in a structure as shown in FIG. 10, i.e., a first diffraction lens grating is formed on the lower substrate of the first liquid crystal layer and the second diffraction lens grating is formed on the upper substrate of the second liquid crystal layer; or the diffraction lens gratings may be formed in a structure as shown in FIG. 17, i.e., a first diffraction lens grating is formed on the lower substrate of the first liquid crystal layer and the second diffraction lens grating is formed on the lower substrate of the second liquid crystal layer; or the diffraction lens gratings may be formed in a structure as shown in FIG. 18, i.e., a first diffraction lens grating is formed on the upper substrate of the first liquid crystal layer and the second diffraction lens grating is formed on the upper substrate of the second liquid crystal layer; or the diffraction lens gratings may be formed in a structure as shown in FIG. 19, i.e., a first diffraction lens grating is formed on the upper substrate of the first liquid crystal layer and the second diffraction lens grating is formed on the lower substrate of the second liquid crystal layer; or the diffraction lens gratings may be formed in a structure as shown in FIG. 20, i.e., the diffraction lens grating is formed on each of the upper and lower substrates of each liquid crystal layer to form a lens group. In this way, it is able to correct the aberration and reduce the divergence angle of the light after the light from the pixel has passed through the lenticular lens, thereby to improve the 3D display quality of the optical field.

According to the display device in the embodiments of the present disclosure, through the arrangement of multiple layers of lens arrays, each lens array may be switched between an on state and an off state, so as to expand the viewing space of the multi-viewpoint optical field display.

In some embodiments of the present disclosure, the display device may further include an eye tracking module configured to detect an eye position, and the controller is configured to apply or not apply the voltage to each of the first transparent electrode and the second transparent electrode in each lens array in accordance with a detection result of the eye position.

It should be appreciated that, a threshold may be set so as to determine whether the eye position detected by the eye tracking module is close to or far away from the display device. Taking tow lens arrays as an example, Table 1 shows a mapping relationship between eye positions and on/off states of the lens arrays in the display device.

TABLE 1

| Distance between eye position and display device | First lens array | Second lens array |
|---|---|---|
| 400 ≤ 500 mm | ON | OFF |
| 500 < 600 mm | OFF | ON |

Table 1 merely shows two groups of lens arrays in the display device. It should be appreciated that, the quantity of the lens arrays may be adaptively adjusted in accordance with the distance between the eye position and the display device.

Figure 21:
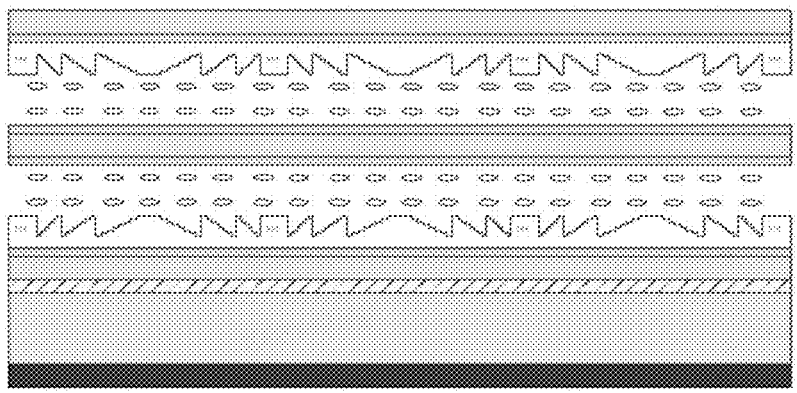
FIG. 21 is still yet another schematic view showing the diffraction lens grating unit according to one embodiment of the present disclosure.

It should be appreciated that, as shown in FIG. 21, when all the lens arrays are in the off state, the light from the display module may not be modulated, and the display device may achieve 2D display. Hence, the display device in the embodiments of the present disclosure is also capable of being switched between the 2D display and the 3D display.

Figure 22:
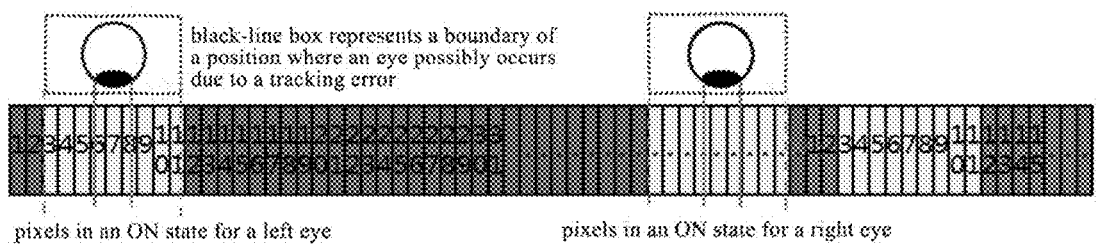
FIG. 22 is a schematic view showing a situation where the display device is switched from 3D display to two-dimensional (2D) display in the case that all the lens arrays are turned off according to one embodiment of the present disclosure.

In order to achieve the optical field 3D display for the multi-viewpoints in the pupil in a better manner, the display device may further perform 3D drawing layout in accordance with a coordinate position of an eye from the eye tracking module. FIG. 22 shows a layout rule. By taking the pixel error into consideration, the subpixels at a region where the two eyes possibly occur may be turned on, corresponding 3D view information may be loaded, and the other subpixels may be turned off, so as to achieve the 3D display.

It should be appreciated that, FIG. 22 merely shows the distribution of projection views in the space after the light from a part of subpixels of one pixel island pass through two lenticular lenses.

The present disclosure further provides in some embodiments a display method for the above-mentioned display device, which includes: controlling a voltage applied to each of the first transparent electrode and the second transparent electrode in one lens array of a plurality of lens arrays in such a manner that a refractive index of a liquid crystal molecule in the liquid crystal layer of the lens array is not equal to a refractive index of the diffraction lens grating of the lens array; and controlling a voltage applied to each of the first transparent electrode and the second transparent electrode in each of the other lens arrays of the plurality of lens arrays in such a manner that a refractive index of the liquid crystal molecule in the liquid crystal layer of the other lens array is equal to a refractive index of the diffraction lens grating of the other lens array.

In some embodiments of the present disclosure, the display method may further include detecting an eye position, and determining the one lens array in the plurality of lens arrays in accordance with the eye position.

It should be appreciated that, a principle and an operating procedure of the display method may be similar to those of the display device, and thus will not be particularly defined herein.

In the embodiments of the present disclosure, it should be appreciated that, such words as "upper" and "lower" are used to indicate directions or positions as viewed in the drawings, and they are merely used to facilitate the description in the present disclosure, rather than to indicate or imply that a device or member must be arranged or operated at a specific position. Unless otherwise specified, such words as "arrange" and "connect" have a general meaning, e.g., the word "connect" may refer to fixed connection, removable connection or integral connection, or mechanical or electrical connection, or direct connection or indirect connection via an intermediate component, or communication between two components. The meanings of these words may be understood by a person skilled in the art in accordance with the practical need.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display assembly, comprising:
a display module comprising a plurality of pixel islands arranged in an array form; and
a plurality of lens arrays laminated one on another at a light-exiting side of the display module,
wherein each lens array of the plurality of lens arrays comprises a substrate, a cover plate arranged opposite to the substrate, a first transparent electrode arranged at a side of the substrate facing the cover plate, a second transparent electrode arranged at a side of the cover plate facing the substrate, and a liquid crystal layer and a diffraction lens grating arranged between the first transparent electrode and the second transparent electrode;

the diffraction lens grating comprises a plurality of diffraction lens grating units corresponding to the plurality of pixel islands respectively; and a voltage is applied to each of the first transparent electrode and the second transparent electrode in such a manner that a refractive index of a liquid crystal molecule in the liquid crystal layer is equal to or not equal to a refractive index of the diffraction lens grating, wherein the quantity of the plurality of lens arrays laminated one on another is greater than 2, with respect to two adjacent lens arrays in the plurality of lens arrays, the substrate of a lens array distal to the display module in the two adjacent lens arrays is reused as the cover plate of another lens array proximal to the display module in the two adjacent lens arrays.

2. The display assembly according to claim 1, wherein the diffraction lens grating comprises a first diffraction lens grating arranged at a side of the cover plate facing the substrate and/or a second diffraction lens grating arranged at a side of the substrate facing the cover plate.

3. The display assembly according to claim 1, further comprising a polarizer arranged between the display module and the lens array.

4. The display assembly according to claim 3, wherein the display module is a Liquid Crystal Display (LCD) module or an Organic Light-Emitting Diode (OLED) display module.

5. The display assembly according to claim 3, wherein a long-axis direction of the liquid crystal molecule in the liquid crystal layer is substantially parallel to an optical axis of the polarizer.

6. The display assembly according to claim 1, further comprising a transparent spacer layer arranged between the display module and the lens array.

7. The display assembly according to claim 1, wherein a distance between each lens array and the display module and a width of each diffraction lens grating unit are determined in accordance with a viewing space of designed multi-viewpoint optical field display and a resolution of the multi-viewpoint optical field display.

8. The display assembly according to claim 1, wherein a length of each pixel in the pixel island is approximately one third of the width of the diffraction lens grating unit.

9. The display assembly according to claim 1, wherein the diffraction lens grating unit is an N-step phase diffraction lens grating unit, where N is $2^n$, and n is a positive integer.

10. The display assembly according to claim 9, wherein the diffraction lens grating unit is an 8-step phase diffraction lens grating unit.

11. The display assembly according to claim 10, wherein a phase difference between adjacent steps of the 8-step phase diffraction lens grating unit is $2\pi/N$, and a height h of each step is calculated through $$h = \frac{\lambda/N}{n_e - n_o},$$

where $\lambda$ represents a wavelength of incident light, $n_e$ represents a refractive index of a grating material, and $n_o$ represents a refractive index of ordinary light, i.e., a refractive index of linearly polarized light perpendicular to the long-axis direction of the liquid crystal molecule.

12. The display assembly according to claim 1, wherein the width of the diffraction lens grating unit is designed in accordance with a length of a subpixel.

13. The display assembly according to claim 12, wherein the width of the diffraction lens grating unit is approximately three times of the length of each subpixel in the plurality of pixel islands.

14. A display device, comprising: a controller and a display assembly, wherein the display assembly comprises:

a display module comprising a plurality of pixel islands arranged in an array form; and a plurality of lens arrays laminated one on another at a light-exiting side of the display module, wherein each lens array of the plurality of lens arrays comprises a substrate, a cover plate arranged opposite to the substrate, a first transparent electrode arranged at a side of the substrate facing the cover plate, a second transparent electrode arranged at a side of the cover plate facing the substrate, and a liquid crystal layer and a diffraction lens grating arranged between the first transparent electrode and the second transparent electrode;

the diffraction lens grating comprises a plurality of diffraction lens grating units corresponding to the plurality of pixel islands respectively;

a voltage is applied to each of the first transparent electrode and the second transparent electrode in such a manner that a refractive index of a liquid crystal molecule in the liquid crystal layer is equal to or not equal to a refractive index of the diffraction lens grating; and the controller is configured to control the voltage applied to each of the first transparent electrode and the second transparent electrode in each lens array of the plurality of lens arrays, wherein the quantity of the plurality of lens arrays laminated one on another is greater than 2, with respect to two adjacent lens arrays in the plurality of lens arrays, the substrate of a lens array distal to the display module in the two adjacent lens arrays is reused as the cover plate of another lens array proximal to the display module in the two adjacent lens arrays.

15. The display device according to claim 14, further comprising an eye tracking module configured to detect an eye position, wherein the controller is configured to control the voltage applied to each of the first transparent electrode and the second transparent electrode in each lens array of the plurality of lens arrays in accordance with a detection result of the eye position.

16. The display device according to claim 15, wherein when the quantity of the a plurality of lens arrays is greater than 2, the controller is further configured to control the voltage applied to each of the first transparent electrode and the second transparent electrode in one lens array of the plurality of lens arrays in such a manner that the refractive index of the liquid crystal molecule in the liquid crystal layer of the lens array is not equal to the refractive index of the diffraction lens grating of the lens array, and control the voltage applied to each of the first transparent electrode and the second transparent electrode in each of the other lens arrays of the plurality of lens arrays in such a manner that the refractive index of the liquid crystal molecule in the liquid crystal layer of the other lens array is equal to the refractive index of the diffraction lens grating of the other lens array.

17. The display device according to claim 16, further comprising a detector configured to detect an eye position, wherein the controller is further configured to control the voltage applied to each of the first transparent electrode and the second transparent electrode in one lens array of the plurality of lens arrays in accordance with the detected eye position in such a manner that the refractive index of the liquid crystal molecule in the liquid crystal layer of the lens array is not equal to the refractive index of the diffraction lens grating of the lens array, and control the voltage applied to each of the first transparent electrode and the second transparent electrode in each of the other lens arrays of the plurality of lens arrays in accordance with the detected eye position in such a manner that the refractive index of the liquid crystal molecule in the liquid crystal layer of the other lens array is equal to the refractive index of the diffraction lens grating of the other lens array.

18. A display method applied to the display device according to claim 14, comprising:

controlling a voltage applied to each of the first transparent electrode and the second transparent electrode in one lens array of a plurality of lens arrays in such a manner that a refractive index of a liquid crystal molecule in the liquid crystal layer of the lens array is not equal to a refractive index of the diffraction lens grating of the lens array; and controlling a voltage applied to each of the first transparent electrode and the second transparent electrode in each of the other lens arrays of the plurality of lens arrays in such a manner that a refractive index of the liquid crystal molecule in the liquid crystal layer of the other lens array is equal to a refractive index of the diffraction lens grating of the other lens array.

19. The display method according to claim 18, further comprising detecting an eye position, and determining the one lens array in the plurality of lens arrays in accordance with the eye position.

20. The display device according to claim 14, wherein the diffraction lens grating comprises a first diffraction lens grating arranged at a side of the cover plate facing the substrate and/or a second diffraction lens grating arranged at a side of the substrate facing the cover plate.

* * * * *